United States Patent
Usami

(10) Patent No.: US 7,515,133 B2
(45) Date of Patent: Apr. 7, 2009

(54) ONBOARD DISPLAY DEVICE

(75) Inventor: Tomohide Usami, Okazaki (JP)

(73) Assignee: DENSO CORPORATION, Kariya (JP)

( * ) Notice: Subject to any disclaimer, the term of this patent is extended or adjusted under 35 U.S.C. 154(b) by 534 days.

(21) Appl. No.: 10/878,398

(22) Filed: Jun. 29, 2004

(65) Prior Publication Data
US 2005/0046760 A1 Mar. 3, 2005

(30) Foreign Application Priority Data
Jul. 14, 2003 (JP) ............................. 2003-274056

(51) Int. Cl.
*G09G 3/36* (2006.01)
(52) U.S. Cl. ........................................ 345/99; 219/202
(58) Field of Classification Search ................. 345/99, 345/101; 349/161; 219/202; 340/461
See application file for complete search history.

(56) References Cited

U.S. PATENT DOCUMENTS 5,880,431 A * 3/1999 Niimi et al. ................. 219/202
6,147,418 A * 11/2000 Wilson ....................... 307/10.6
6,330,497 B1 * 12/2001 Obradovich et al. ............ 701/1
2002/0151992 A1 * 10/2002 Hoffberg et al. .............. 700/83
2003/0231157 A1 * 12/2003 Sugino et al. ............... 345/101

FOREIGN PATENT DOCUMENTS

| JP | A-60-258582 | 12/1985 |
| JP | U-61-183470 | 11/1986 |
| JP | A-H09-304751 | 11/1997 |
| JP | A-H10-160496 | 6/1998 |

OTHER PUBLICATIONS

Examination Report dated Feb. 15, 2008 in corresponding Japanese Patent Application No. 2003-274056 (and English translation).

* cited by examiner

*Primary Examiner*—Amr Awad
*Assistant Examiner*—Yong Sim
(74) *Attorney, Agent, or Firm*—Posz Law Group, PLC

(57) ABSTRACT

A display device for a vehicle includes a liquid crystal display (LCD), a panel heater, and a display control circuit. The LCD has a LCD panel and the panel heater is attached to a front of the LCD panel. The display control circuit detects the current time and determines whether the current time is five minutes ahead of a scheduled start time stored in a memory. If so, the display control circuit starts driving the panel heater for warming up the LCD to a proper temperature for providing clear images by the scheduled start time.

23 Claims, 4 Drawing Sheets

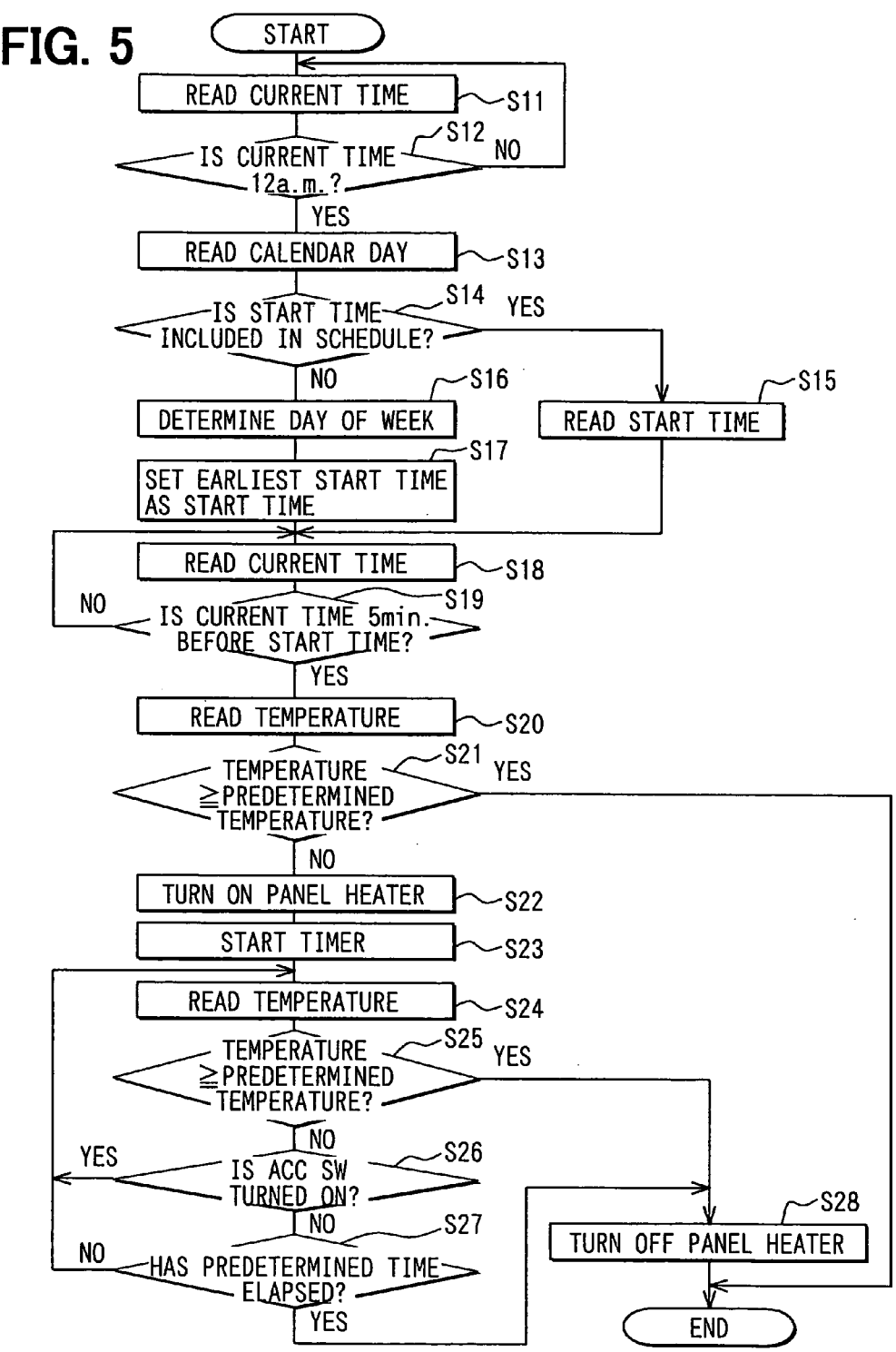

ONBOARD DISPLAY DEVICE

CROSS REFERENCE TO RELATED APPLICATION

This application is based on and incorporates herein by reference Japanese Patent Application No. 2003-274056 filed on Jul. 14, 2003.

FIELD OF THE INVENTION

The present invention relates to an onboard display device having a heating unit for a liquid crystal display.

BACKGROUND OF THE INVENTION

A display device is installed in a vehicle for displaying a map around a current location of the vehicle, traffic or road information, and television pictures. A liquid crystal display (LCD) is commonly used in such a display device. The LCD has characteristics of a slow response under a low temperature due to characteristics of a liquid crystal material. Images on the LCD look blurry when the response of the LCD is slow, that is, at the low temperature. Therefore, it will take a while until the LCD is warmed up by a room heater to an appropriate temperature for providing clear images when the vehicle is started under a low temperature.

To solve this problem, a heater may be provided in the display device. The LCD is not warmed up immediately after an accessory switch of an ignition switch system is turned on and the heater is turned on. As a result, the images still look blurry at the start of the vehicle even when the heater is provided.

A heater for preheating a cold cathode fluorescent tube is proposed in JP-A-9-48281. The heater starts heating the cold cathode fluorescent tube when an unlocking of a vehicle door is detected. Thus, the cold cathode fluorescent tube is heated prior to a start of a vehicle. However, it will take longer to warm up the LCD. Therefore, the LCD may not be warmed up to the appropriate temperature when the warm-up of the LCD is started upon the detection of the unlocking of the vehicle door.

SUMMARY OF THE INVENTION

The present invention therefore has an objective to provide an onboard display device, an LCD of which is warmed up to a proper temperature for providing clear images at a start of a vehicle. An onboard display device of the present invention has a liquid crystal display (LCD), a heating unit, storage means, clock means, and control means. The heating unit warms up the LCD to the proper temperature. The storage means stores a scheduled start time of the vehicle. The clock means detects the current time. The control means drives the heating unit for warming up the LCD according to the current time and the scheduled time.

The control means starts the heating unit driving control at a time determined by a comparison between the current time and the scheduled start. The time is determined so that the LCD is warmed up to a proper temperature for providing clear images at a start of the vehicle. Therefore, a user sees clear images on the LCD from the beginning of a drive.

The present invention has another objective to provide a method for controlling a driving of a heating unit provided for warming up an LCD installed in a vehicle. A method of the present invention includes detecting a current time, comparing the current time with a scheduled start time, determining the current time is a predetermined period ahead of a scheduled start time, starting a driving of the heating unit when the current time is the predetermined period ahead of the scheduled time. Since the heating unit starts warming up the LCD the predetermined period ahead of the start time, the LCD is warmed up to a proper temperature for providing clear images by the start time. Therefore, a user sees clear images on the LCD from the beginning of a drive.

BRIEF DESCRIPTION OF THE DRAWINGS

The above and other objectives, features and advantages of the present invention will become more apparent from the following detailed description made with reference to the accompanying drawings. In the drawings:

FIG. 5 is a flowchart of a heater driving control program according to the embodiment.

DETAILED DESCRIPTION OF THE PREFERRED EMBODIMENT

The preferred embodiments of the present invention will be explained with reference to the accompanying drawings.

Figure 1:
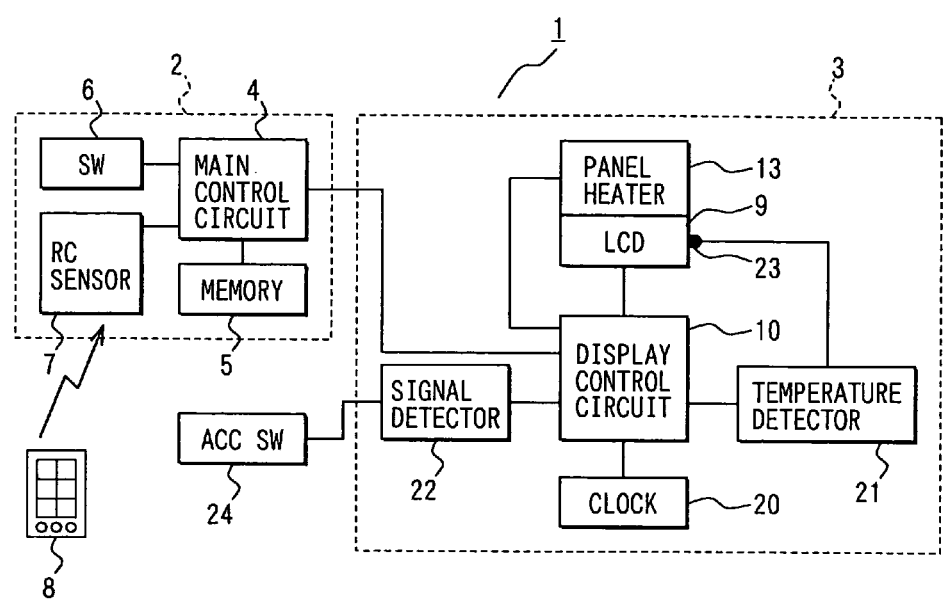
FIG. 1 is a block diagram of a display device according to an embodiment of the present invention.

Referring to FIG. 1, a vehicle navigation system 1 is constructed of a main unit 2 and a display unit 3. The main unit 2 includes a main control circuit 4, a memory 5, switches 6, and a remote control (RC) sensor 7. A remote control (RC) device 8 is provided as an accessory for transmitting signals to the RC sensor 7. The main unit 2 further includes a position detector unit (not shown) and a map data storage (not shown).

The main control circuit 4 calculates the current position of a vehicle based on position information provided by the position detector unit. Then, it obtains map data on the peripheral area of the current position from the map data storage and sends the data to the display unit 3. The switches 6 and the RC device 8 function as input devices. The user can make a selection from various kinds of menus or set a destination for searching a route to the destination through the switches 6 or the RC device 8.

Figure 2:
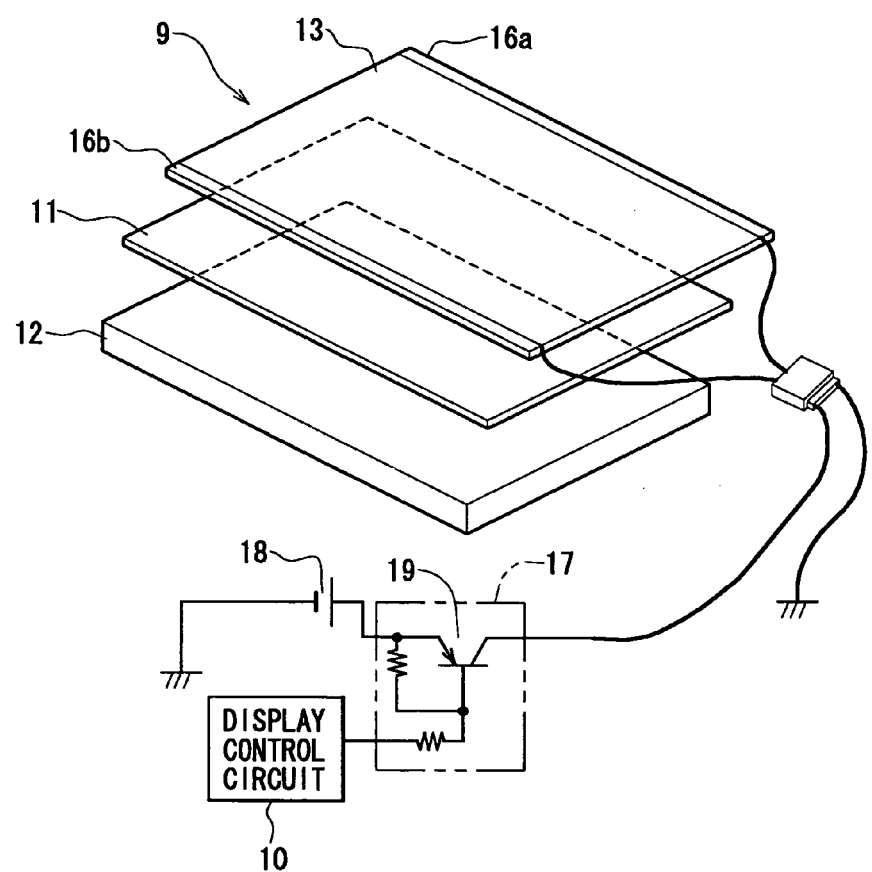
FIG. 2 is a perspective view of an LCD and a circuit diagram of a drive circuit for a panel heater according to the embodiment.
Figure 3:
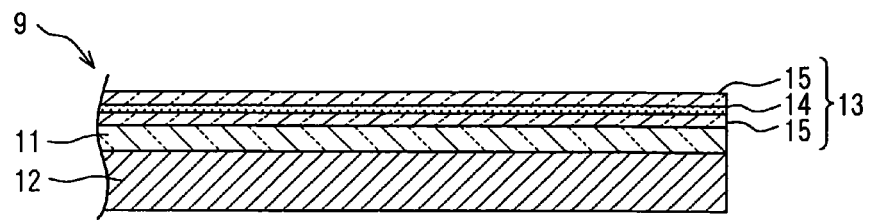
FIG. 3 is a cross sectional view of the LCD according to the embodiment.

The display unit 3 includes a crystal liquid display (LCD) 9 and a display control circuit 10 for displaying the map data sent from the main unit 2 on the LCD 9. The LCD 9 is constructed of an LCD panel 11 and a backlight unit 12 that is arranged at the rear of the LCD panel 11 as shown in FIGS. 2 and 3. A panel heater 13, which is a heating unit, is attached to the front surface of the LCD panel 11. The panel heater 13 is constructed by sandwiching a transparent resistor film with two glass plates 15. A pair of electrodes 16a, 16b is provided on opposed edges of the panel heater 13. When a voltage is applied across the electrodes 16a, 16b, current flows through the resistance film 14 and heat is produced.

The electrodes 16a, 16b are connected to a ground and to a positive terminal of an onboard battery 18 via the driving circuit 17, respectively. One of the electrode 16a connected to the ground is referred to as a ground electrode 16a, and the other is referred to as a positive electrode 16b. The negative terminal of the battery 18 is grounded. The driving circuit 17 includes a PNP transistor 19. An emitter, a collector, and a base of the transistor 19 are connected to the battery 18, the positive electrode 16*b*, and the display control circuit 10, respectively. When the display control circuit 10 switches the voltage applied to the base of the transistor from high to low, the transistor 19 turns on and current passes through the resistance film 14.

The display unit 3 further includes a clock 20, a temperature detector circuit 21, and a signal detector circuit 22. The clock 20 detects a calendar day and the current time. The temperature detector circuit 21 detects temperatures and the signal detector circuit 22 detects a start of the vehicle. The display control circuit 10 stores days of the week that correspond to the calendar days in its memory. The signal detector circuit 22 processes a signal from a temperature sensor 23 and inputs it to the display control circuit 10. The temperature sensor 23 provides signals for detecting the temperature of the LCD panel 11.

The signal detector circuit 22 processes an on-signal that indicates a turn-on of an accessory switch (ACC SW) 24 of an ignition switch system, and inputs it to the display control circuit 10. The ignition switch system is a switch for controlling start and stop of an engine. It has four switching positions: off, accessory, on, start positions. The user turns on the accessory switch 24 when starting an engine for driving the vehicle. Therefore, a start of vehicle can be detected by the accessory switch 24 and the signal detector circuit 22.

When the main control circuit 10 receives the on-signal from the signal detector circuit 22, it accesses the clock 20 and reads the current time. It stores the current time in the memory 5 as a start time. The main unit 2 has a schedule function. The user can input schedules, including a start time, via the switches or the RC 8. The inputted schedules are stored in the memory 5. The main control circuit 4 sends the stored schedules to display unit 3 upon a start up of the system 1 or upon a request by the user for displaying on the LCD 9.

The user can inputs a daily scheduled start time using this schedule function. The display control circuit 10 performs heater driving control for warming up the LCD panel 11 by the panel heater 13 prior to the start of the vehicle. It reads the current time from the clock 20. If the start time is included in the schedules stored in the memory 5, the display control circuit 10 compares the current time with the scheduled start time. Then, it starts the heater driving control at a time having a predetermined time difference relative to the scheduled start time detected through the comparison.

For example, the display control circuit 10 compares the current time with the scheduled start time and determines whether the current time is five minutes ahead of the scheduled start time. If so, it starts the heater driving control. As a result, the LCD 9 is warmed up to a proper temperature by the scheduled time and the user can see clear images from the beginning of a drive. If the start time is not included in the schedules, the display control circuit 10 estimates the start time based on the start time in history data. It starts the heater driving control five minutes before the estimated start time.

Figure 4:
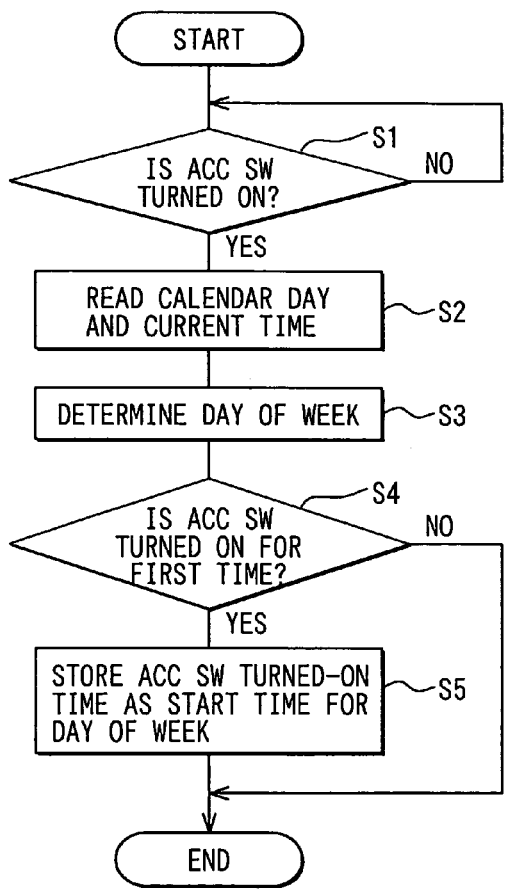
FIG. 4 is a flowchart of a start time storing program according to the embodiment.

The heater driving control will be discussed in detail referring to FIGS. 4 and 5. The display control circuit 10 performs steps for storing the earliest start time of each day in the memory 5 as shown in FIG. 4. The display control circuit 10 determines whether the accessory switch 24 is turned on (S1). If yes, it accesses to the clock 20 for reading the calendar day and the current time (S2).

It refers to a calendar day table stored in its memory and determines a day of the week that corresponds to the calendar day inputted from the clock 20 (S3). Then, it determines whether the accessory switch 24 is turned on for the first time of the current day (S4). If yes, it stores the time at which the accessory switch 24 is turned on in the memory as the start time of the day of the week (S5). Ten start times are stored for each day of the week and the start time of the oldest day among the ten start times is erased every time a new start time is inputted.

The heater driving control program will be discussed referring to FIG. 5. The display control circuit 10 reads the current time (S11) and determines whether the current time is 12 a.m. (S12). If the current time is 12 a.m., it reads a calendar day of the current day from the clock 20 (S13) and determines whether a start time of the current day is included in the schedule stored in the memory 5 (S14).

If the start time is included, the display control circuit 10 reads the scheduled start time from the memory 5 (S15). If the start time is not included, it determines a day of the week of the current day (S16) and refers to history data on past start times stored in the memory 5. Then, it selects the earliest start time from the ten start times of the day of the week corresponding to the day of the current day and sets it as the scheduled start time of the current day (S17).

The display control circuit 10 reads the current time from the clock 20 (S18) and determines whether the current time is five minutes before the scheduled start time (S19). When the current time is five minutes before the scheduled start time, the display control circuit 10 accesses the temperature detector circuit 21 for reading a temperature of the LCD PANEL 11 (S20). It determines whether the temperature is equal to or higher than a predetermined temperature (S21). If yes, the warm-up of the LCD panel 11 is not necessary. Therefore, the display control circuit 10 terminates the heater driving control program.

When the temperature is lower than the predetermined temperature, the display control circuit 10 starts the warm-up of the LCD panel 11. It turns on the panel heater 13 by turning on the transistor 19 (S22) and starts a timer for counting time of the warm-up (S23). It monitors the temperature and the warm-up time while the panel heater 13 is turned on. It reads the temperature (S24) and determines whether the temperature is equal to or higher than the predetermined temperature (S25). If not, it determines whether the accessory switch 24 is turned on for examining necessity to terminate the heater driving control program (S26). If the accessory switch 24 is not turned on, the display control circuit 10 determines whether a predetermined time has been elapsed since the scheduled start time (S27). The display control circuit 10 repeats these steps S24 through S27 for monitoring the temperature and the warm-up time.

When the temperature is equal to or higher than the predetermined temperature, the display control circuit 10 turns off the panel heater 13 by turning off the transistor 19 and terminates the program (S28). If the predetermined time has elapsed without the accessory switch 24 being turned on before the LCD panel 11 is warmed up to the predetermined temperature, it turns off the panel heater 13 and terminates the program (S28).

The panel heater 13 starts warming up the LCD 9 a predetermined time ahead of the scheduled start time, for instance, five minutes ahead of the scheduled start time. As a result, the LCD 9 is warmed up to a proper temperature by the time when the user turns on the accessory switch 24 to start the vehicle. Namely, clear images are displayed on the LCD 9 when the accessory switch 24 is turned on and the LCD 9 is turned on.

The display control circuit 10 estimates a start time based on past starting times and starts warming up the LCD 9 prior to the estimated start time. Thus, the LCD 9 is properly warmed up for providing clear images even when the user forgets to input a start time. In the estimation of the start time, the display control circuit 10 selects a start time from past start times of the day of the week corresponding the day of the current day. Therefore, improper start time setting can be reduced. For example, a start time may set at early in the morning even though the current day is Sunday and the user does not start the vehicle at such an early time. Since the display control circuit 10 estimates the start time referring to a day of the week of the current day, improper setting of the start time is less likely to occur.

Furthermore, the display control circuit 10 turns off the panel heater 13 when the predetermined time has elapsed since the start time even though the LCD 9 does not reach the predetermined temperature. Thus, energy stored in the battery 18 is not overly wasted even when the estimated time is far ahead of an actual start time. This function is especially useful for a cold day because it will take a long period of time to warm up the LCD 9 to a proper temperature. The battery 18 continues to supply power to the panel heater 13 without being charged by the engine for a long period of time and a life of the battery is shortened. The display control circuit 10 turns off the panel heater 13 when the predetermined time has elapsed since the start time without the accessory switch 24 being turned on although the temperature does not reach the predetermined temperature. As a result, such a problem is less likely to occur.

The present invention should not be limited to the embodiment previously discussed and shown in the figures, but may be implemented in various ways without departing from the spirit of the invention. For example, the scheduled start time may be inputted by the user, namely, the user can input any particular time as a scheduled start time. If the user inputs a time earlier than a time that the user actually plans to start the vehicle, the display control circuit 10 may start the heater driving control at the inputted scheduled start time or at the predetermined period after the scheduled start time.

The heater driving control can be started when a lock of a vehicle door is released via a remote control key. In this case, a door open detector may be provided. When an opening of the door is not detected by the door open detector after the release of the door lock, the heater driving control may be terminated.

What is claimed is:

1. An onboard display device comprising:
   a liquid crystal display installed in a vehicle;
   a heating unit that warms up the liquid crystal display;
   storage means that stores a plurality of scheduled start times of the vehicle;
   clock means that detects a current time;
   control means that drives the heating unit for warming up the liquid crystal display according to the current time and a current one of the scheduled start times of the vehicle,
   obtaining means for obtaining a current calendar day and current time by accessing the clock means when the vehicle starts, wherein the obtaining means determines a current day of the week that corresponds to the obtained current calendar day and correlates the obtained current time with the determined current day of the week;
   start time storing means for storing a plurality of correlated current times in the storage means as the plurality of scheduled start times for a plurality of days of the week, respectively; and
   start time estimating means for estimating the start time of the vehicle by selecting one of the scheduled start times of one of the plurality of days of the week, wherein the one of the plurality of days of the week corresponds to the current day of the week,
   wherein the control means starts the heating unit driving control at a time that is different from the current scheduled start time by a predetermined time difference, and the time at which the heating unit is started is determined through a comparison between the current time and the current scheduled start time.

2. The onboard display device according to claim 1, wherein the scheduled start times are inputted by a user of the vehicle.

3. The onboard display device according to claim 1, wherein the time at which the control means starts the heating unit driving control is earlier than the current scheduled start time by the predetermined time difference.

4. The onboard display device according to claim 1, wherein the control means further includes:
   time comparing means that compares the current time with the current scheduled start time;
   time determining means that determines whether the current time is earlier than the current scheduled start time by the predetermined time difference; and
   heating unit driving means that starts the heating unit earlier than the current scheduled start time by the predetermined time difference.

5. The onboard display device according to claim 1, further comprising power-on detecting means that detects a powering-on of the vehicle, wherein:
   the control means includes elapsed time determination means; and
   the elapsed time determination means determines whether the powering-on is detected within a predetermined elapsed time from the current scheduled start time for examining whether it is necessary to terminate the beating unit driving control.

6. The onboard display device according to claim 5, wherein the control means includes driving control terminating means that terminates the heating unit driving control when it is confirmed that it is necessary to terminate the heating unit driving control.

7. A method for controlling a driving of a heating unit provided for warming up a liquid crystal display installed in a vehicle, wherein the method comprises:
   obtaining a current calendar day and a current time when the vehicle starts;
   determining a current day of the week that corresponds to the obtained current calendar day;
   correlating the obtained current time with the determined current day of the week:
   storing a plurality of the correlated current times as a plurality of scheduled start times for a plurality of days of the week, respectively;
   estimating a start lime of the vehicle by selecting one of the scheduled start times of one of the days of the week, the one of the days of the week corresponding to the current day of the week;
   determining whether the current time differs from the estimated start time by a predetermined time difference; and
   driving the heating unit at a time point when the current time differs from the estimated start time for warming up the liquid crystal display by the predetermined time difference.

8. The method according to claim 7, wherein the determining step determines whether the current time is earlier than the estimated start time by the predetermined time difference.

9. The method according to claim 7, further comprising receiving a scheduled start time from a user; and storing the received scheduled start time.

10. The method according to claim 7, further comprising:
detecting a powering-on of the vehicle;
detecting an elapsed time from the scheduled start time;
determining whether the powering-on is detected within a predetermined elapsed time; and
terminating the heating unit driving control when the powering-on is not detected within the predetermined elapsed time.

11. The onboard display device according to claim 1, wherein the scheduled start times are times scheduled for starting operation of the vehicle.

12. The method according to claim 7, wherein the scheduled start times are times scheduled for starting operation of the vehicle.

13. The method according to claim 7, wherein the driving of the heating unit includes driving the heating unit at a time that is earlier than the estimated start time by the predetermined time difference.

14. An onboard display device comprising:
a liquid crystal display installed in a vehicle;
a heating unit that warms up the liquid crystal display;
storage means that stores a scheduled start time for beginning operation of the vehicle;
clock means that detects a current time;
control means that drives the heating unit for warming up the liquid crystal display according to the current time and the scheduled start time
obtaining means for obtaining a current calendar day and current time by accessing the clock means when the vehicle starts, wherein the obtaining means determines a current day of the week that corresponds to the obtained current calendar day and correlates the obtained current time with the determined current day of the week;
start time storing means for storing a plurality of correlated current times in the storage means as the plurality of scheduled start times for a plurality of days of the week, respectively; and
start time estimating means for estimating the start time of the vehicle by selecting one of the scheduled start times of one of the plurality of days of the week, wherein the one of the plurality of days of the week corresponds to the current day of the week, and wherein
the control means starts the heating unit driving control at a time that is earlier than the scheduled start time by a predetermined time difference, and
the time at which the heating unit is started is determined through a comparison between the current time and the scheduled start time.

15. A method for controlling a driving of a heating unit provided for warming up a liquid crystal display installed in a vehicle, the method comprising:
obtaining current calendar day and current time when the vehicle starts;
determining current day of the week that corresponds to the obtained current calendar day;
correlating the obtained current time with the determined current day of the week;
storing a plurality of the correlated current times as a plurality of scheduled start times for a plurality of days of the week, respectively;
estimating a start time of the vehicle by selecting one of the scheduled start times of one of the days of the week, the one of the days of the week corresponding to the current day of the week;
determining whether the current time differs from the estimated start time by a predetermined time difference; and
driving the heating unit at a time point when the current time is earlier than the estimated start time by the predetermined time difference.

16. The onboard display device according to claim 1, wherein
the start time estimating means estimates the start time based on the current day of the week.

17. The method according to claim 7, further comprising:
estimating the start time based on the start times in the history data regarding the day of the week.

18. The onboard display device according to claim 1, wherein the start time estimating means estimates the start time based on history data, and
the history data include several past values of the start time.

19. The method according to claim 7, wherein the start time estimating means estimates the start time based on history data, and
the history data include several past values of the start time.

20. The onboard display device according to claim 14,
wherein the start time detecting means further includes day detecting means that detects a day of the current day from the clock means;
the start time estimating means estimates the start time based on the day of the current day.

21. The onboard display device according to claim 14, wherein the start time estimating means estimates the start time based on history data, and the history data include several past values of the start time.

22. The method according to claim 15, further comprising:
estimating the start time based on the start times in the history data regarding the day of the week.

23. The method according to claim 15, wherein the history data include several past values of the start time.

* * * * *